Oct. 1, 1957   F. L. SCOBY   2,808,289
CARGO CONTAINER AND VEHICLE
Filed Oct. 20, 1954   3 Sheets-Sheet 1

INVENTOR.
FRANK LEONARD SCOBY
BY
Bacon + Thomas
ATTORNEYS

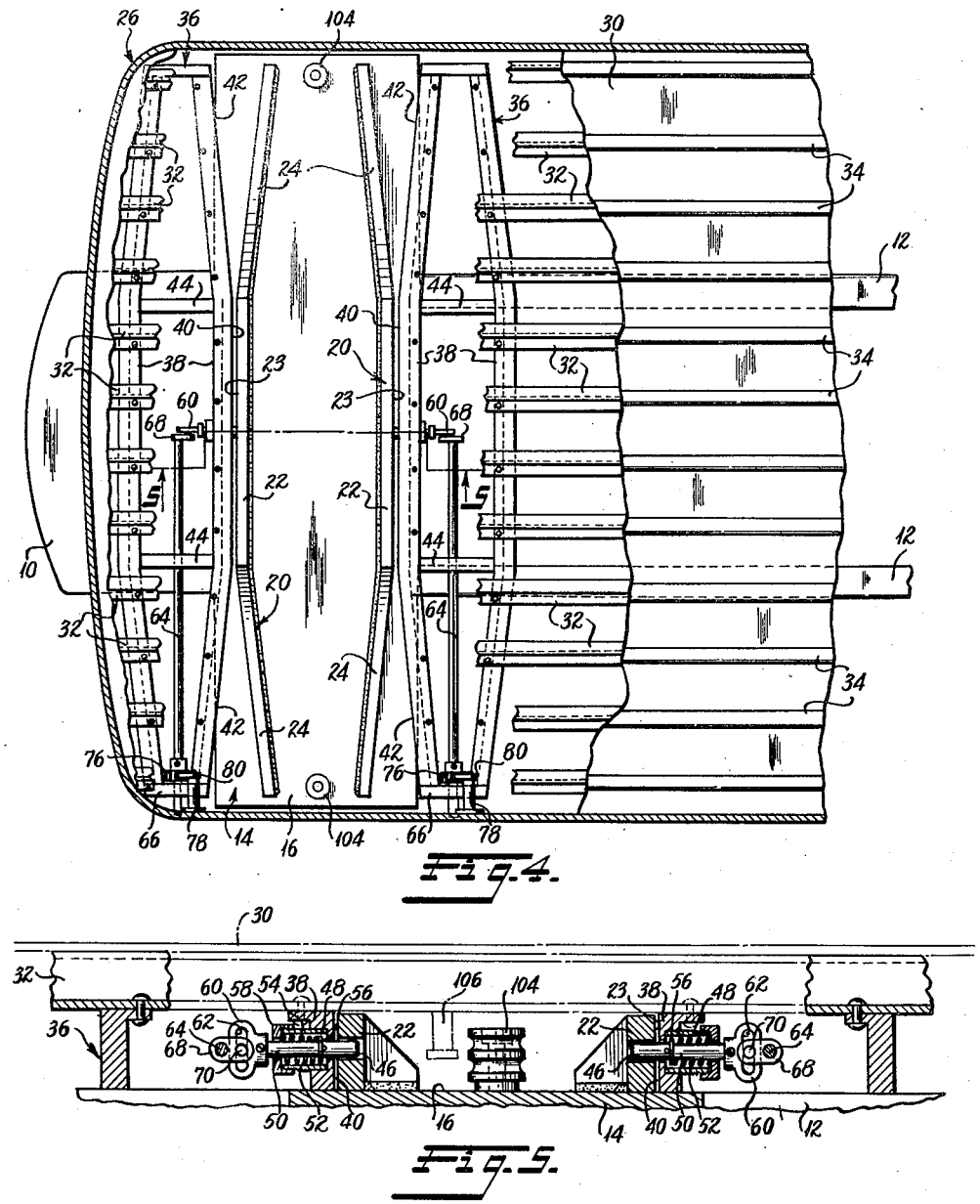

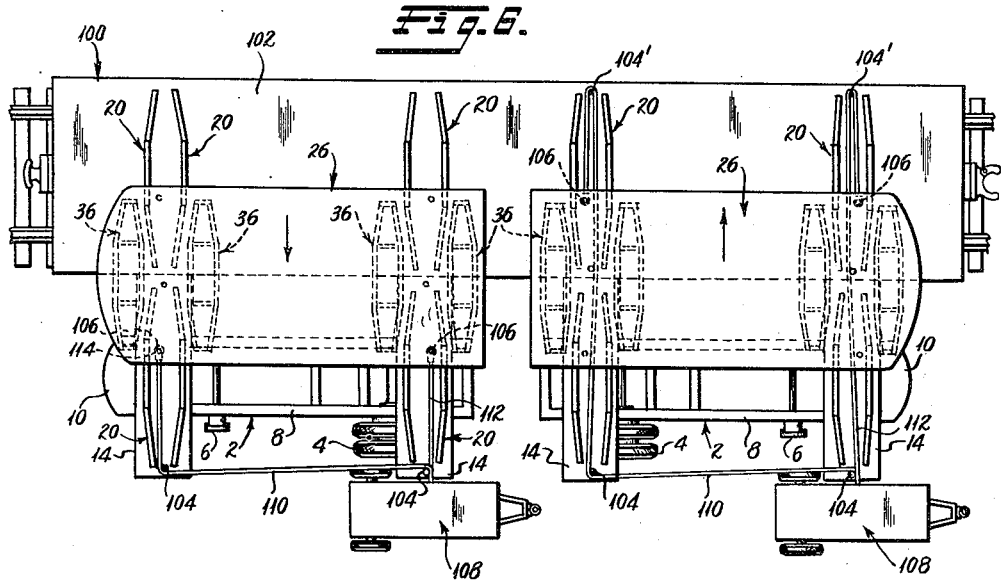
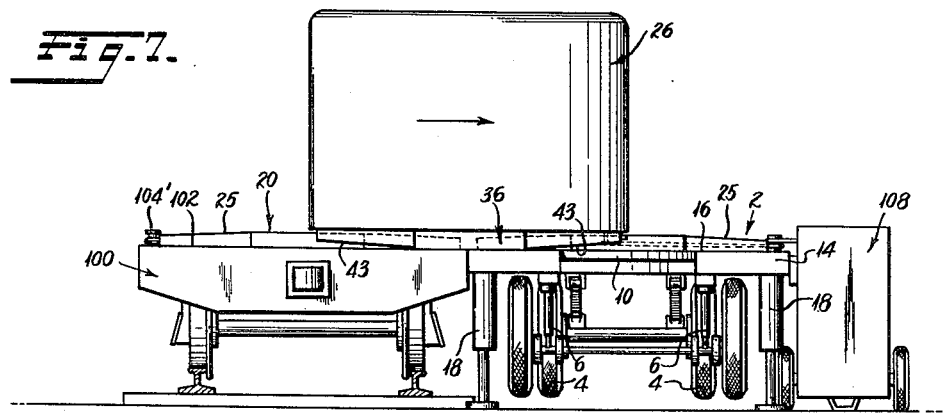
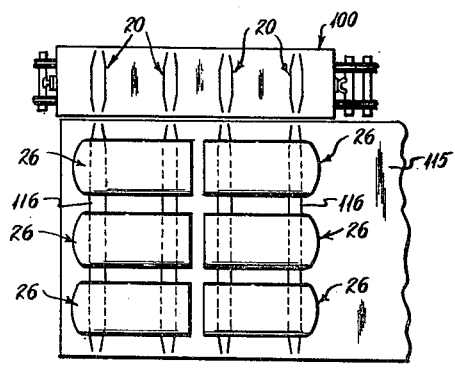
INVENTOR.
FRANK LEONARD SCOBY

United States Patent Office 2,808,289
Patented Oct. 1, 1957

2,808,289

CARGO CONTAINER AND VEHICLE

Frank Leonard Scoby, Chicago, Ill.

Application October 20, 1954, Serial No. 463,560

2 Claims. (Cl. 296—35)

This invention relates to cargo containers and vehicles for transporting the same, with particular relation to the combination between a transferable cargo container and a vehicle whereby the container may be readily transferred from one vehicle, for instance, a truck or trailer, to another vehicle such as a railway car.

The broad concept of transferring a container of cargo from a truck to a railway car is not new. The desirability of being able to prepare less than carload lots of freight or other cargo at sites other than railroad assembly points and thereafter handle those small lots as a unit during transportation and delivery has long been recognized and many attempts have been made to devise a practical arrangement. In general, prior attempts involve the use of movable ramps to be temporarily installed between a truck trailer and a railway car, such ramps providing a trackway over which a wheeled cargo container could be transferred from a truck or trailer to the railway car for shipment and thereafter again transferred from the railway car to a truck or trailer, at the destination, for delivery directly to the consignee. Such systems and devices have not proven satisfactory for various reasons, including the complexity of the apparatus and the difficulty encountered in properly aligning the truck or trailer with the railway car and ramps to effect efficient transfer of the container.

The present invention embodies a cargo container having rigid skids or runners fixed to its bottom surface to serve as bearing members to support the container and to cooperate with complementary guide means on both the railway car and truck whereby the container may be readily transferred from one vehicle to the other without accurate alignment of the guides on the two vehicles. The invention utilizes complementary guiding and positioning means rigidly secured to the vehicle and to the container, respectively, which means comprise generally transverse runners or rails on both elements of the combination. One of the members of the combination is provided with spaced guides, whereas the other is provided with what is essentially a single guide receivable between the spaced guides and operable to guide the container during sliding movement over the load-supporting surfaces. The guides or bearing members on the container serve to support its weight and means are provided for securely locking the container to the vehicle on which it is to be transported.

According to the present invention, no rollers or wheels are employed and thus a frequent source of failure of prior art devices is avoided. The cooperating guide means on the container and vehicle allow for considerable longitudinal relative movement during the initial stages of the transfer operation and are provided with relatively inclined surfaces for guiding the movable member to a predetermined position longitudinally of the vehicle to which it is being transferred. The members fixed to the bottom of the cargo container define runners or skids of sufficient length to span an appreciable gap between the adjacent vehicles and thus eliminate the necessity for ramps or bridging rails from one vehicle to the other.

It is therefore an object of the present invention to provide a novel and economical transferable container and vehicle combination.

It is another object of this invention to provide means for the rapid and accurate transfer of a cargo container from one vehicle to another without the use of bridging ramps or aligned trackways.

It is still another object of this invention to provide a transferable cargo container and vehicle of simple construction involving a minimum number of parts and without employing rollers or wheels.

A further object of this invention is to provide a transferable cargo container and vehicle wherein the container can be rapidly and accurately positioned in firm and stable relationship to its vehicle and securely but releasably locked in place thereon.

A still further object of this invention is to provide a transferable cargo container and vehicle adaptable to different systems of handling the containers and to different devices for applying the power to transfer such a container from one vehicle to another.

An additional object of this invention is to provide a transferable cargo container and vehicle having cooperating parts consisting largely of duplicate elements whereby the combination may be economically constructed.

Another additional object of this invention is to provide a transferable cargo container and vehicle combination readily adaptable to conventional highway and/or railroad vehicles with a minimum of change in standard vehicle construction.

Still additional objects and advantages will become apparent to those skilled in the art as the description proceeds in connection with the accompanying drawings, wherein:

Fig. 4 is a fragmentary sectional view, on an enlarged scale, taken substantially along the line 4—4 of Fig. 1, with parts of the container floor being broken away;

Fig. 5 is a vertical sectional view, on a further enlarged scale, taken substantially along the line 5—5 of Fig. 4;

Fig. 6 is a plan view illustrating the operations of transferring a cargo container from a truck trailer to a railway car and from the railway car to another truck trailer;

Fig. 7 is an end elevational view of Fig. 6, viewing the same from the left end thereof; and Fig. 8 is a diagrammatic view of an alternate system of marshalling and handling transferable freight containers at a railway assembly point.

Figure 1:
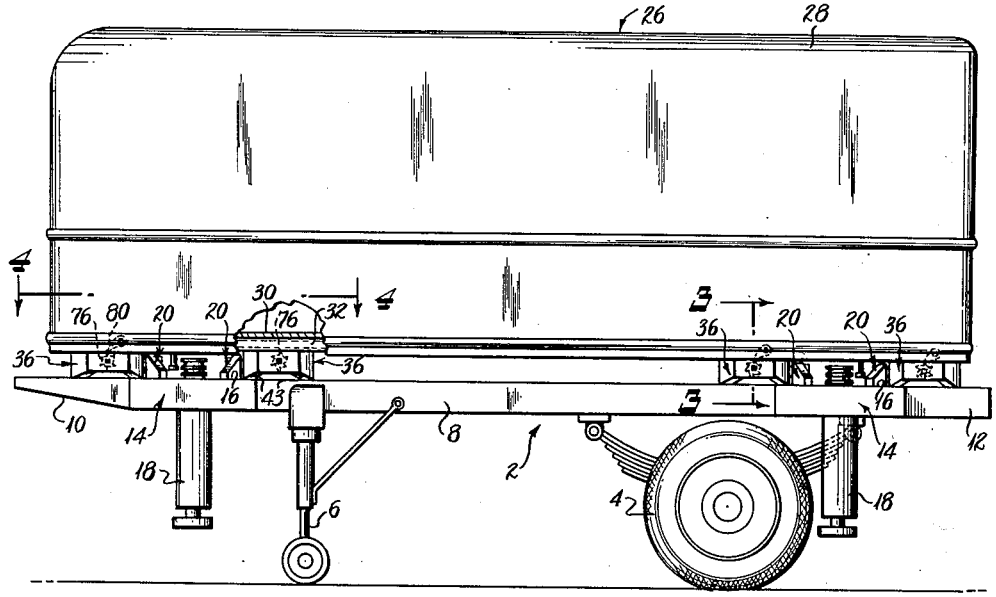
Fig. 1 is a side elevational view of a truck trailer and cargo container incorporating the present invention.

Referring first to Fig. 1, the trailer, indicated generally by numeral 2, may be of any usual or conventional construction having road wheels 4, "landing gear" 6 and a main longitudinal frame 8. The trailer illustrated in Fig. 1 is merely representative of many forms the road vehicle may take and may be a semi-trailer as illustrated, including a "fifth wheel" arrangement 10 for connection to the usual truck or tractor.

The main frame 8 consists of a longitudinal structure which may be only frame beams 12 (see also Fig. 4) and is provided with transverse platforms 14 near its forward and rear ends. One of the transverse platforms 14 is shown in plan view in Fig. 4 and each provides an upper load-supporting, generally planar surface 16 extending transversely of the vehicle to its lateral extremities. The load-bearing surface 16 is of substantial fore and aft dimension, for a purpose to be described hereinafter.

The trailer 2 is also provided with a plurality of jacks 18 positioned at the lateral and fore and aft corners of the trailer structure whereby the trailer frame may be elevated to such position as illustrated in Fig. 7. The jacks may be of any desired or well known construction and may be power-operated or manually operated.

Figure 2:
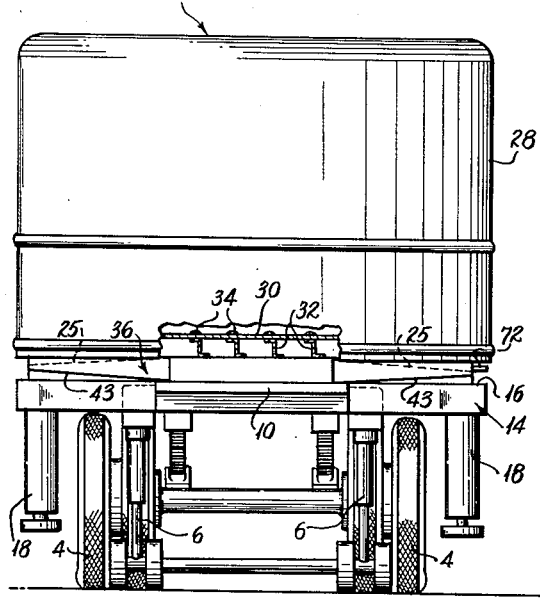
Fig. 2 is a front elevational view of Fig. 1 with certain parts broken away.

Each of the platforms 14 has a load-bearing surface 16, preferably of steel, upon which guide means 20 (see Fig. 4) are secured. The guide means 20 may be solid metal structures permanently welded to the platforms 14 of the vehicle or may be secured thereto in any other desired manner, but are so arranged and constructed as to define central portions 22 having their outer edges arranged generally vertically and defining spaced parallel guide surfaces 23. The end portions 24 of the guide means 20 extend from the ends of the central portions 22 substantially to the lateral extremities of the vehicle in converging relation to each other, as clearly shown in Fig. 4. The upper surfaces 25 of the end portions 24 slope downwardly, as is clear from Figs. 1, 2 and 7.

The cargo container 26 may be a closed container as illustrated, having an enclosed body portion 28 and a bottom load-supporting floor 30. The load-supporting surface rests on and is secured to a plurality of longitudinally extending beams 32 providing the necessary load-supporting strength for the cargo container. If desired, the upper surface of floor 30 may be provided with spaced ribs or rails 34, as is conventional, to facilitate sliding movement of crates, packages or the like along the container floor.

The cargo container is provided with transversely extending bearing members or skids 36 securely fixed to the bottom thereof such as by welding or riveting the same to the bottom flanges of beams 32 (see also Fig. 5). The skids or bearing members 36 (Fig. 4) each consist of a truss-like structure having central portions 38 spaced apart longitudinally of the container and defining a space therebetween having opposed parallel guide surfaces 40. The guide surfaces 40 are spaced apart a distance only slightly greater than the distance between the guide surfaces 23 on the members 22 so that, in the position of Fig. 4, the cargo container is accurately positioned longitudinally of the vehicle. The end portions of the bearing members 36 taper toward the sides of the container, as at 42, and their bottom surfaces 43 slope upwardly from the ends of the central portions 38 to the lateral extremities thereof, as clearly shown in Figs. 2, 3 and 7. The skids or bearing members 36 include transverse bracing members 44.

Referring now to Fig. 5, the skids or bearing members 36 secured to the cargo container are of slightly greater height than the central portions 22 of the guide members 20 fixed to the vehicle and as is clearly evident from that figure the bottom surfaces of the central portions 38 of bearing members 36 rest directly on the load-bearing surface 16 of the vehicle for transverse sliding movement thereover. The relative dimensions of the platforms 14 of the vehicle and the fore and aft spacing between the outer parallel edges 23 of guide members 20 is such that at least the inner ones of central portions 38 of the bearing members 36 rest on the upper surface 16 and that surface extends directly therefrom to the lateral extremities of the vehicle so that the cargo container can be supported on the surface 16 during its entire sliding movement laterally off either edge of the vehicle.

As also shown in Fig. 5, the central portions 22 of the guide members 20 are provided with horizontal openings 46 therethrough in alignment with counterbored openings 48 in the central portions 38 of the bearing members 36. Locking pins 50 are mounted for sliding movement in the openings 48 into locking relation with the openings 46 in guide members 22. Suitable means such as springs 52 are provided to normally project the pins 50 into the space between the guide surfaces 40 and into the openings 46 of members 22. Each of the springs 52 is enclosed by a housing 54 carried by its bearing member 38 and bears at one end against a washer or collar 56 on pin 50 and the other end against the inner surface of a cap 58 on the housing 54. The ends of the pins 50 within the bearing members 36 are provided with heads 60, each having a vertical slot 62 therein. Operating shafts 64, journalled in transverse members 44 of the bearing members 36, extend from positions adjacent the heads 60 of pins 50 laterally of the cargo container and through end transverse members 66 of the bearing members 36. The shafts 64, at their inner ends, are each provided with a crank arm 68 carrying a crank pin 70 projecting into the slot 62 of the adjacent head 60.

Figure 3:
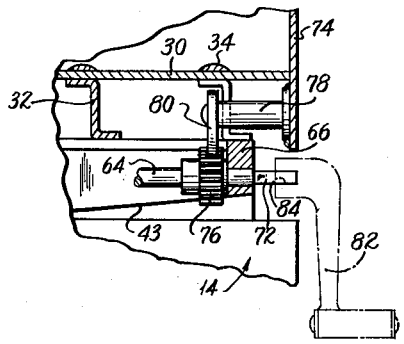
Fig. 3 is an enlarged fragmentary sectional view taken substantially along the line 3—3 of Fig. 1.

Referring now to Figs. 3 and 4, each shaft 64 is also journalled in an end member 66 and is preferably provided with a squared end portion 72 closely adajcent the outermost extremity of the cargo container and preferably slightly below the bottom edge of side wall 74 thereof. A ratchet wheel 76 is fixed to each shaft 64 inwardly of the transverse member 66. A supporting member 78 is fixed in any suitable manner to the cargo container body and pivotally carries a pawl 80 in position to engage the teeth of ratchet wheel 76. The pawl 80 may be gravity actuated, as shown, or may be spring urged into engagement with ratchet wheel 76 and prevents rotation of its shaft 64 in one direction, for instance clockwise as seen in Fig. 1, while permitting free rotation in the other direction. A suitable crank 82, provided with a socket 84 complementary to the end 72 of shaft 64, may be placed on the end of the shaft 64 and manually turned to rotate that shaft in the direction permitted by the pawl 80. It will be evident that rotation of shaft 64 in either direction from the position shown in Fig. 5 through an angle of about 180° will result in withdrawing pin 50 from the opening 46 against the action of spring 52. When the shaft 64 is rotated in the permitted direction by an amount slightly less than 180°, its associated pin 50 is completely withdrawn from the corresponding opening 46 against the action of spring 52 and the ratchet wheel 76 and pawl 80 prevent return rotation of the shaft under the influence of the spring 52. The crank 82 is removable from the shaft 64 whereby no portions of the locking mechanism described extend beyond the extremities of the cargo container and thus the locking mechanism is not subject to accidental actuation and unwanted release of the locking pins. It is a simple matter to apply the crank to the end of shaft 64 to rotate the shaft when it is desired to release a container from its vehicle for transfer therefrom.

After the locking pins 50 have been withdrawn from locking engagement in the openings 46, the container may be transferred to a second vehicle having guide members corresponding to guide members 22 with similar locking openings 46 therein. After the container has been transferred to the second vehicle and moved to the proper position laterally thereof wherein the pins 50 are aligned with the openings 46, the crank 82 may be again applied to the shaft 64 and the latter rotated again in the same direction until the crank pin 70 passes "over center" with the pin 50 in its withdrawn position. After the "over center" position is passed, the spring 52 can again expand and project locking pin 50 into the adjacent opening 46. This action results in a corresponding rotation of shaft 64 in the direction permitted by the pawl 80. Thus, it is only necessary to impart a small angular rotation to shaft 64, after the container has been "spotted" on the vehicle and the locking pins 50 are then projected into their locking position automatically.

It will be obvious that the locking pins 50 are effective to securely lock the container to its vehicle against both lateral sliding movement and vertical movement relative thereto. Thus, the transferable container becomes, in effect, a rigidly secured part of the vehicle until it is desired to effect transfer thereof.

The cargo container 26 may be of any desired proportions and may be sufficiently short to necessitate only one pair of bearing members 36 engageable with a single pair of guide means 20 on the vehicle or the container may be of the general proportions shown in the drawing wherein the supporting, guiding and locking structures heretofore described are duplicated at each end of the container and road vehicle.

Figs. 6 and 7 also illustrate a railway car 100 having an upper load-bearing surface 102, preferably steel, upon which guide members 20, identical to those on the trailer 2, are secured. The guide members 20 may be identical in all respects to those described in connection with Figs. 1 through 5 whereby the cargo container 26 may be moved into the same relationship thereto as described in connection with Figs. 1 through 5.

Railway cars are conventionally considerably longer than truck trailers and thus it is possible to provide for the loading of at least two of the cargo containers 26 on each railway car 100.

As shown in Fig. 7, the trailer or other road vehicle 2 may be positioned alongside the railway car 100 in close proximity thereto and the jacks 18 then operated to lift the trailer from the ground to such a height that its upper surface 16 is in substantial alignment with the surface 102 of the railway car. The jacks 18 thus function not only to elevate the trailer frame, but to provide a firm and broad base therefor. When the trailer frame and railway car are in the relative positions shown in Fig. 7, the cargo container may be released from its locking engagement with the vehicle it is then on and readily slid laterally thereof onto the adjacent vehicle. It will be evident from an inspection of Fig. 6 that the guide means 20 on one vehicle need not be exactly aligned with the corresponding guide means on the adjacent vehicle since the walls defining the space between the pairs of bearing members 36 on the container diverge outwardly. If there is some fore and aft misalignment between the guide means on the two adjacent vehicles, the angled surfaces of the end portions of both the guide means and bearing members will engage each other and effect a forward or rearward shift of the container, as it is moved transversely, to bring the central portions of its bearing members in proper position to embrace the central portions of the guide means 20.

Furthermore, the load-bearing surface 16 of the trailer need not be in exact coplanar relation to the load-bearing surface 102 of the railway car. There may be a slight "step" between those surfaces or one may be tilted upwardly at its outermost edge and the container will still slide readily from one to the other by virtue of the upwardly inclined bottom surfaces 43 of the end portions of bearing members 36 and the corresponding downward inclination of the upper surfaces 25 of the end portions 24 of guide means 20.

Fig. 6 illustrates an arrangement for effecting sliding movement of a container 26 either to or from a railway car or trailer. The container 26 shown at the left of Fig. 6 is being pulled from the railway car 100 to the trailer 2. For this purpose, the trailer is provided with idler pulleys 104 journalled on vertical axes near the outer ends of the platforms 14 and about midway between the longitudinally spaced elements defining the guide means 20 (see also Figs. 1, 4 and 5). The cargo container is provided with downwardly extending studs 106 rigidly fixed to the bottom thereof adjacent but somewhat inwardly of its outer edges and generally midway between the guide edges 40 but slightly to one side of a median line therebetween. In other words, the studs 106 are so positioned as to project downwardly from the cargo container into the space between the elements of the guide means 20 but at such position that the container may be moved laterally of the vehicle with the studs 106 passing alongside the guide pulleys 104. Returning again to Fig. 6, any suitable power-operated winch mechanism such as the portable unit schematically shown at 108 may be employed to provide the power for transferring the cargo container. The portable winch unit 108 may be provided with any suitable power source such as an electric motor or internal combustion engine arranged to drive a winch on which a pair of cables 110 and 112 are wound. Rotation of the winch (not shown) simultaneously pays out or reels in both cables 110 and 112. The power unit 108 may be positioned in abutment with an end of one of the platforms 14 of the trailer 2 with cable 110 extending around the adjacent pulley 104 then longitudinally of the trailer to the other pulley 104 and thence transversely of the trailer to a hook or ring 114 engaging a stud 106 on the cargo container. The other cable 112 extends directly from the power unit 108 to another stud 106 at the other end of the container. It will be obvious that the power unit 108 may then be operated to pull the container 26 from the railway car onto the trailer 2 by simultaneously reeling in both cables 110 and 112. Thereafter, the cables 110 and 112 may be readily disconnected from the studs 106, the container locked to the trailer, and the trailer may then be lowered and connected to an appropriate tractor. The cargo contained in the container 26 is then ready for local transport, by truck, to the desired destination.

The right hand end of Fig. 6 illustrates a set-up for transferring the cargo container 26 from trailer 2 to the railway car 100. To effect this transfer the portable power unit 108 may be positioned in the same relation to the trailer 2 as previously described but with the cables 110 and 112 extending completely across the trailer 2 and railway car 100 to guide pulleys 104' on the far side of the railway car and thence back into engagement with studs 106 on the far side of the container. It will again be obvious that power actuation of the winch in the unit 108 to reel in cables 110 and 112 will effect sliding transfer of the container from the trailer 2 to the railway car 100.

The power units 108 shown are merely illustrative of one means with which the containers may be transferred from one vehicle to another. It will be obvious to those skilled in the art that many other devices may be resorted to for applying the necessary lateral forces to the container to effect its transfer from one vehicle to another.

Fig. 8 is a diagrammatic illustration of a manner in which a group of transferable containers of the present invention may be assembled and collected at a suitable "dock" for making up carload lots. A suitable dock or platform structure 115 is provided with guide means 116 fixed to the upper surface thereof. The guide means 116 are identical in all respects to the guide means 20 heretofore described, except that they are of materially greater length so that the central portions thereof can accommodate a plurality of transferable containers 26. As will be readily apparent, the containers 26 may be transferred to the dock 115 directly from trucks or the like and be so arranged that each pair of containers constituting one carload lot may be transferred to a single railway car 100 for transportation to the same destination. Such a dock 115 may also be employed for remaking a train when it becomes necessary to shift a particular container from one railway car to another.

The present invention, therefore, provides a rugged and economical vehicle and cargo container combination of maximum durability since no supporting wheels, rollers, tracks or the like are employed. To facilitate transfer of a loaded container from one vehicle to another, it would be practical to apply a suitable lubricant to the load-supporting surfaces for the purpose of minimizing the power required to effect a transfer and to further prolong the life of the parts.

The bearing members 26 may be of any desired fore and aft dimension, but each is preferably of the truss-like construction described to provide longitudinally spaced supports for the floor 30 of the container.

Both the bearing members 36 and the guide means 20 may be fabricated from a minimum number of identical parts, thus making the invention economical to produce.

A single specific embodiment of the invention has been shown and described herein but it is to be understood that the embodiment shown is merely illustrative and that the invention may take many other forms within the scope of the appended claims.

I claim:

1. In combination, a vehicle having a substantially planar load-bearing surface, a cargo receiver having a bottom wall, cooperating elongated continuous guides on said load-bearing surface and on said bottom wall, respectively, said guides extending transversely of said cargo receiver and said vehicle substantially to the side edges thereof, one of said guides defining an open channel having generally vertical sides, said sides being parallel intermediate their ends with their end portions diverging outwardly from each other, the other of said guides having opposite parallel side portions snugly receivable between the parallel sides of said channel, the end portions of the opposite sides of said other guide converging toward each other, the guide on said cargo receiver slidably bearing on said load-bearing surface to slidably support the receiver thereon, locking means comprising aligned openings in said guides extending transversely thereof intermediate their ends, a pin slidably carried by one of said guides for movement through said aligned openings to locking position, means normally urging said pin to said locking position, and selectively operable retracting means for retracting said pin from said openings.

2. A combination as defined in claim 1 wherein said aligned openings are substantially midway between the ends of said guides and wherein said retracting means includes a member extending to a position adjacent an end of said guides whereby said member is readily accessible at one side of said combination.

References Cited in the file of this patent

UNITED STATES PATENTS

| | | |
|---|---|---|
| 1,303,854 | Clark | May 20, 1919 |
| 1,486,046 | Smith | Mar. 4, 1924 |
| 1,883,538 | Bywater | Oct. 18, 1932 |
| 1,921,605 | Canfield | Aug. 8, 1933 |
| 2,117,067 | Ludington | May 10, 1938 |
| 2,156,282 | Fitch | May 2, 1939 |
| 2,223,275 | Valenzuela | Nov. 26, 1940 |
| 2,681,159 | McCrossen | June 15, 1954 |